(12) United States Patent
Hirai et al.

(10) Patent No.: US 12,023,999 B2
(45) Date of Patent: Jul. 2, 2024

(54) WING LOCK STRUCTURE, CARGO BED, AND VEHICLE

(71) Applicant: ISUZU MOTORS LIMITED, Tokyo (JP)

(72) Inventors: Makoto Hirai, Fujisawa (JP); Ryota Yamamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 182 days.

(21) Appl. No.: 17/911,355

(22) PCT Filed: Mar. 18, 2021

(86) PCT No.: PCT/JP2021/011218
§ 371 (c)(1),
(2) Date: Sep. 13, 2022

(87) PCT Pub. No.: WO2021/193379
PCT Pub. Date: Sep. 30, 2021

(65) Prior Publication Data
US 2023/0082480 A1    Mar. 16, 2023

(30) Foreign Application Priority Data

Mar. 23, 2020 (JP) ................. 2020-051400

(51) Int. Cl.
*B60J 5/04* (2006.01)
*B62D 33/027* (2006.01)
*B62D 33/04* (2006.01)

(52) U.S. Cl.
CPC .......... *B60J 5/0498* (2013.01); *B62D 33/027* (2013.01); *B62D 33/04* (2013.01)

(58) Field of Classification Search
CPC ...... B60J 5/0498; B60J 5/0473; B60J 5/0477; B60J 7/08; B60J 7/185; B62D 33/027
See application file for complete search history.

(56) References Cited

U.S. PATENT DOCUMENTS

| 4,268,084 A * | 5/1981 | Peters .................... B60J 5/0498 296/100.1 |
| 10,286,829 B2 * | 5/2019 | Choi ........................ B60P 3/20 |

(Continued)

FOREIGN PATENT DOCUMENTS

| JP | H09111892 A | 4/1997 |
| JP | H10236341 A | 9/1998 |

(Continued)

OTHER PUBLICATIONS

Machine Translation of JP2004003362, 2024.*
Machine Translation of WO2022139952, 2024.*

*Primary Examiner* — Jason S Morrow
(74) *Attorney, Agent, or Firm* — PROCOPIO, CORY, HARGREAVES & SAVITCH LLP

(57) ABSTRACT

A wing lock structure includes: a block provided to a side gate, and provided with a plurality of convex portions that are convex in a width direction of a vehicle and concave portions that are concave in the width direction of the vehicle in a longitudinal direction of the vehicle; a wing plate provided at a predetermined portion of a wing side panel facing the block in a closed state and having irregularities corresponding to the concave portions and the convex portions on a surface that comes into contact with the block; and a pressure contact portion that presses the wing plate to bring the wing plate and the block into contact by pressure.

5 Claims, 4 Drawing Sheets

(56) References Cited

U.S. PATENT DOCUMENTS

| | | | | |
|---|---|---|---|---|
| 2014/0373453 | A1* | 12/2014 | Lee | B60P 7/02 |
| | | | | 49/324 |
| 2023/0391171 | A1* | 12/2023 | Gitter | B60J 7/1635 |
| 2024/0116337 | A1* | 4/2024 | Targhi | B60R 3/02 |

FOREIGN PATENT DOCUMENTS

| | | | | |
|---|---|---|---|---|
| JP | 11011154 | A | | 1/1999 |
| JP | 2001260663 | A | | 9/2001 |
| JP | 2004003362 | A | * | 1/2004 |
| JP | 2008195121 | A | | 8/2008 |
| JP | 2011094357 | A | | 5/2011 |
| KR | 10-0983025 | B1 | | 9/2010 |
| WO | WO-2022196652 | A1 | * | 9/2022 |

* cited by examiner

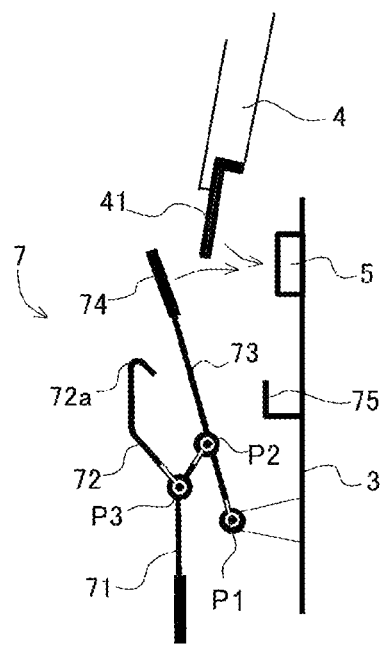
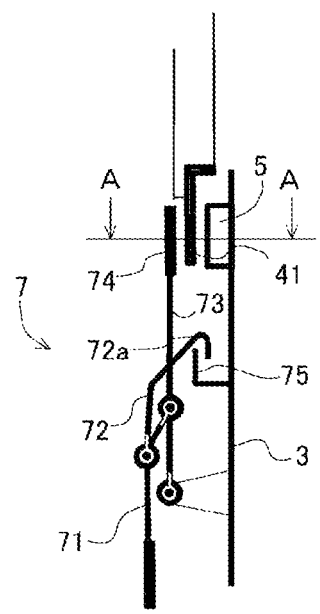
FIG. 2A
FIG. 2B

WING LOCK STRUCTURE, CARGO BED, AND VEHICLE

CROSS-REFERENCE TO RELATED APPLICATIONS

The present application is a U.S. National Stage entry of PCT Application number PCT/JP2021/011218, filed on Mar. 18, 2021, which claims priority under 35 U.S.C § 119(a) to Japanese Patent Application No. 2020-051400, filed on Mar. 23, 2020, contents of which are incorporated herein by reference in their entirety.

TECHNICAL FIELD

The present disclosure relates to a wing lock structure, and more particularly to a wing lock structure for a vehicle employing a wing side panel, a cargo bed, and a vehicle.

BACKGROUND OF THE INVENTION

Among cargo beds mounted on a vehicle or the like, there is a cargo bed having a structure called a wing body. Specifically, the cargo bed includes (1) a floor board, (2) a wing side panel, (3) a side gate, (4) a front panel, and (5) a rear door. By opening and closing the wing side panel and the side gate, the cargo bed can be opened wide, allowing large loads to be loaded from the sides.

Various improvements have been attempted for this wing-body-type cargo bed. For example, Patent Document 1 discloses a technique for improving the design. Patent Document 2 discloses a technique for preventing suction of rainwater. Patent Document 3 discloses a technique for improving strength, airtightness, and heat insulation effect.

PRIOR ART

PATENT DOCUMENTS

Japanese Unexamined Patent Application Publication No. 11-011154
Japanese Unexamined Patent Application Publication No. 10-236341
Japanese Unexamined Patent Application Publication No. 2001-260663

BRIEF DESCRIPTION OF THE INVENTION

Problem to be Solved by the Invention

To improve steering stability and straight travel performance of the vehicle, it is important to increase torsional rigidity of the vehicle. This also applies to a truck (vehicle) provided with a wing-body-type cargo bed.

Accordingly, an object of the present disclosure is to effectively increase the torsional rigidity of the vehicle provided with a wing-body-type cargo bed.

Means for Solving the Problem

A wing lock structure of the first aspect of the present disclosure is a wing lock structure for fixing, in a vehicle provided with a wing-body-type cargo bed having a wing side panel and a side gate, the wing side panel and the side gate in a closed state where the wing side panel and the side gate are closed, the wing lock structure includes a block that is provided to the side gate, and has a plurality of convex portions that are convex in a width direction of the vehicle and concave portions that are concave in the width direction of the vehicle provided in a longitudinal direction of the vehicle, a wing plate provided at a predetermined portion of the wing side panel facing the block in the closed state and having irregularities corresponding to the concave portion and the convex portion on a surface that comes into contact with the block, and a pressure contact portion that presses the wing plate to bring the wing plate and the block into contact by pressure.

Further, the wing plate may also have irregularities on a pressure contact portion side, and the pressure contact portion may have irregularities corresponding to irregularities of the wing plate on a surface that comes into contact with the wing plate.

Further, the wing lock structure may include a pressure contact piece that has the pressure contact portion at an end and is rotatable at another end opposite to the pressure contact portion around a first shaft provided to the side gate, a handle that is rotatable around a second shaft provided at an intermediate portion of the pressure contact piece, and a hooking piece that is rotatably provided to a third shaft provided at an intermediate portion of the handle, and has a hooking portion that can be engaged with a hook provided to the side gate, at a free end opposite to the third shaft.

A cargo bed of the second aspect of the present disclosure includes the wing lock structure.

A vehicle of the third aspect of the present disclosure is provided with the cargo bed.

Effect of the Invention

According to the technique of the present disclosure, it is possible to effectively increase the torsional rigidity of the vehicle provided with a wing-body-type cargo bed. Accordingly, steering stability and straight travel performance of the vehicle can be improved.

BRIEF DESCRIPTION OF THE DRAWINGS

FIGS. 2A and 2B are side views schematically showing a wing lock structure, with FIG. 2A showing an unlocked state and FIG. 2B showing a locked state.

DESCRIPTION OF EMBODIMENTS

Figure 1:
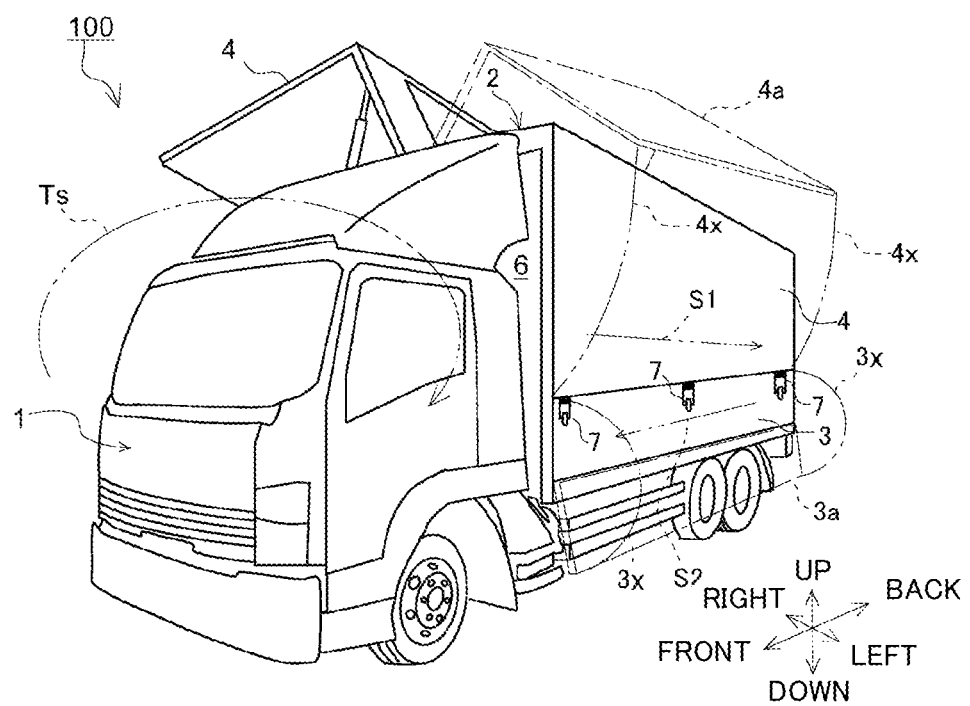
FIG. 1 is a schematic perspective view showing the whole of a vehicle provided with a wing-body-type cargo bed.

Hereinafter, a wing lock structure according to the present embodiment will be described with reference to the attached drawings. The same components are denoted by the same reference numerals, and their names and functions are also the same. Therefore, detailed description thereof will not be repeated.

Overall Configuration

FIG. 1 is a schematic perspective view showing the entirety of a vehicle provided with a wing-body-type cargo bed.

The vehicle of the present disclosure is a cab-over-type truck 100, and includes a cab 1 and a wing-body-type cargo bed 2, for example.

The cargo bed 2 includes a floor board (not shown), a wing side panel 4, a side gate 3, a front panel 6, and a rear door (not shown). When two left and right wing side panels 4 shown in FIG. 1 swing up, the wing side panels 4 are in an open state. FIG. 1 shows a state where the left wing side panel 4 is closed (solid line) and an open state 4a (one-dot chain line). A trajectory line of the wing side panel 4, as the wing side panel 4 changes from the closed state to the open state, is indicated by 4x (two-dot chain line).

In the truck 100 according to the present embodiment, the side gate 3 can also be opened sideways. In FIG. 1, the form of the opened side gate 3 is indicated by a one-dot chain line corresponding to a reference numeral 3a (a trajectory line 3x). In this manner, substantially the entire length of the cargo bed 2 of the truck 100 in the longitudinal direction is opened by opening the wing side panel 4 and the side gate 3, making it possible to easily load and unload a large load.

When the truck 100 travels, twisting of the vehicle may occur. This state is indicated by twisting Ts in FIG. 1. When the twisting Ts occurs in this direction, mutually opposite shear forces S1 and S2 are generated in the wing side panel 4 above the cargo bed 2 and the side gate 3 below the cargo bed 2. Since a shear force on the side relatively changes depending on the twisting direction of the cab 1, if the twisting Ts occurs on the opposite side of the shown side, the directions of the shear force S1 of the wing side panel 4 and the shear force S2 of the side gate 3 are reversed. If the shear forces S1 and S2 are increased and the fixing between the wing side panel 4 and the side gate 3 is insufficient, relative displacement (slippage) may occur.

Wing Lock Structure

FIGS. 2A and 2B are side views schematically showing the wing lock structure 7 for fixing the wing side panel 4 to the side gate 3. FIG. 2A shows a state where the wing lock structure 7 is unlocked, and FIG. 2B shows a state where the wing lock structure 7 is locked. In the figures, circles with white circles therein mean rotating shafts. A white straight line extending from a white circle indicates a rotating member.

The wing side panel 4 and the side gate 3 are fixed by the wing lock structure 7. The wing lock structure 7 of the present embodiment includes a pressure contact piece 73, a hooking piece 72, a handle 71, and a hook 75. The first end of the pressure contact piece 73 is rotatably fixed by the first rotating shaft P1 (the first shaft of the present disclosure) serving as a supporting point fixed to the side gate 3. The second end on the opposite side of the pressure contact piece 73 is provided with a pressure contact portion 74 as a free end.

The second rotating shaft P2 (the second shaft of the present disclosure) is provided in the middle (an intermediate portion) of the pressure contact piece 73, and the handle 71 is rotatably connected to the pressure contact piece 73 around the second rotating shaft P2. The handle 71 is bent to be substantially V-shaped in the middle (an intermediate portion), and the third rotating shaft P3 (the third shaft of the present disclosure) is provided to the bent portion. The opposite side of the hooking portion 72a of the hooking piece 72 is rotatably connected to the third rotating shaft P3. In other words, the hooking piece 72 has a V-shaped hooking portion 72a that can be engaged with the hook 75 provided to the side gate 3, at a free end opposite to the third rotating shaft P3.

The user of the vehicle can change the wing lock structure 7 from an unlocked state (see FIG. 2A) to a locked state (see FIG. 2B) by hooking the hooking portion 72a of the hooking piece 72 to the hook 75 and pressing the handle 71 to the side gate 3. In a state where the wing lock structure 7 is locked, the pressure contact portion 74 at the end (the free end) of the pressure contact piece 73 moves to the side gate 3 side, and the pressure contact piece 73 contacts the wing side panel 4 while applying pressure to a block 5 attached to the side gate 3. A wing plate 41 of the wing side panel 4 is positioned between the pressure contact portion 74 and the block 5. The wing plate 41 is fixed by being sandwiched and pressed between the pressure contact portion 74 and the block 5, and so displacement (movement) between the wing side panel 4 and the side gate 3 is suppressed.

Conventional Example

Figure 5:
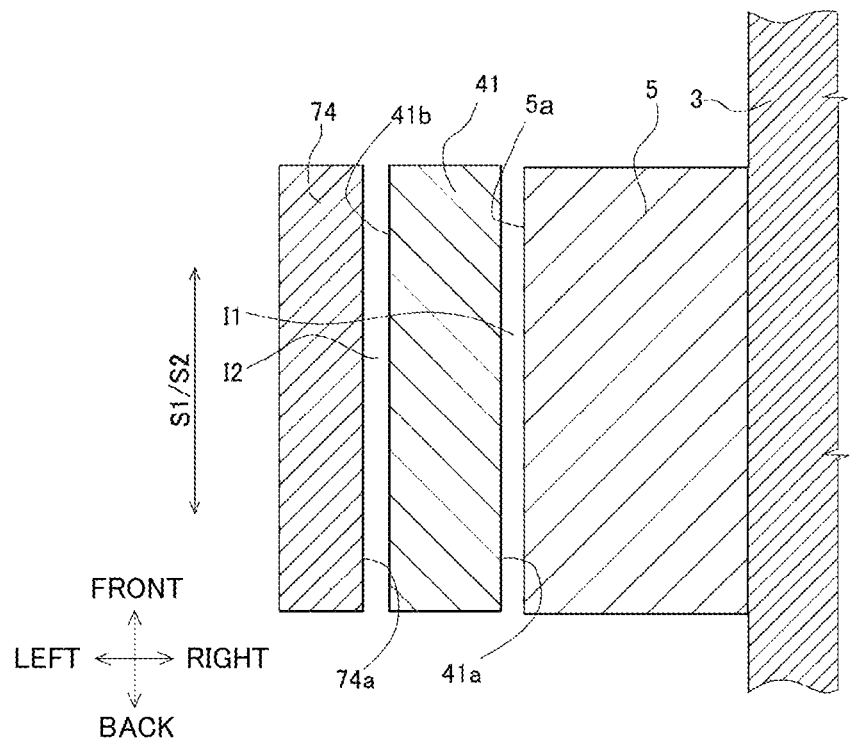
FIG. 5 is an enlarged cross section schematically showing a cross section taken along the line A-A of FIG. 2B in a comparative example.

FIG. 5 is an enlarged cross section schematically showing a cross section taken along a line A-A of FIG. 2B, and shows a configuration of a comparative example.

In the comparative example, the block 5, the wing plate 41 of the wing side panel 4, and the pressure contact portion 74 of the pressure contact piece 73 are all rectangular. More specifically, a surface 5a of the block 5 contacting the wing plate 41 is a flat surface. Similarly, the first contact surface 41a and the second contact surface 41b of the wing plate 41 are flat surfaces. The same applies to the pressure contact portion 74 of the pressure contact piece 73, and a contact surface 74a contacting the wing plate 41 is a flat surface. In other words, an interface I1 and an interface I2 are both flat surfaces, and a plurality of members come into contact with each other.

As described above, when portions where the plurality of members come into contact with each other are flat, each member tends to slip at the interface. Specifically, when the twisting (Ts) of the vehicle described above occurs, relative shear forces (S1, S2) are generated between the wing side panel 4 and the side gate 3. Arrows S1/S2 in FIG. 5 indicate directions of the shear forces (S1, S2). More specifically, the shear forces (S1, S2) act in a front-back direction at the interface I1. In this comparative example, when a strong shear force is applied, slippage on a flat surface occurs since the interface I1 is a flat surface. Although the interface I2 is not directly affected, the shear forces (S1, S2) also act on the interface I2, assuming that the slippage at the interface I1 stops. For this reason, twisting of the vehicle may affect steering stability and straight travel performance of the vehicle.

In the illustrated configuration, the block 5, the wing plate 41, and the pressure contact portion 74 are separated from each other by spaces, but this is for convenience of illustration, and it is assumed that these members come into contact with each other in a locked state. This also applies to FIGS. 3 and 4.

First Embodiment

Figure 3:
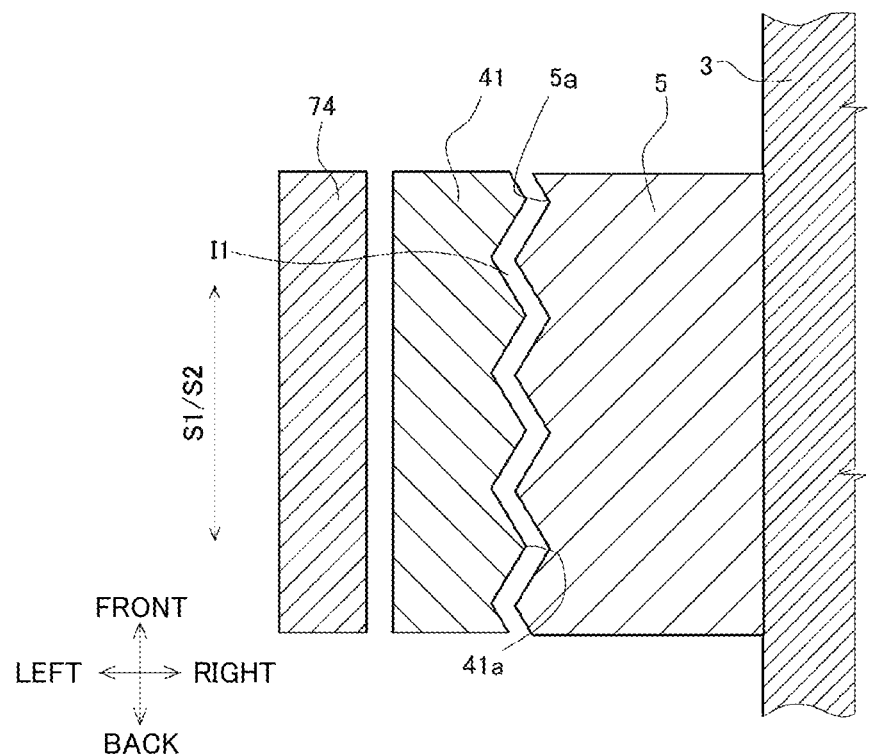
FIG. 3 is an enlarged cross section schematically showing a cross section taken along the line A-A of FIG. 2B according to the first embodiment.

FIG. 3 is an enlarged cross section schematically showing a cross section taken along a line A-A of FIG. 2B, and shows a preferred embodiment of the present disclosure.

As shown in FIG. 3, the block 5 is disposed at the side gate 3 in the present embodiment. When the wing lock structure 7 is locked, the pressure contact portion 74 presses the wing plate 41 of the wing side panel 4 toward the block 5, thereby fixing the wing plate 41 to the block 5. In the present embodiment, irregularities, in which a plurality of convex portions that are convex in the width direction of the vehicle and a plurality of concave portions that are concave in the width direction of the vehicle are arranged in the longitudinal direction of the vehicle, are formed on the surface 5a of the block 5 that comes into contact with the wing plate 41. Further, irregularities corresponding to the irregularities of the block 5 are formed on a surface 41a (a predetermined portion facing the block 5 in the closed state) of the wing plate 41 that comes into contact with the block 5.

Accordingly, even if relative shear forces due to the shear force SI of the wing side panel 4 and the shear force S2 of the side gate 3, which is an opposite direction to the shear force S1, are generated on a contact surface (I1) between the block 5 and the wing plate 41, the movement of the block 5 and the wing plate 41 on the contact surface (I1) is suppressed. In the present disclosure, irregularities corresponding to irregularities means irregularities that follow predetermined irregularities when fitted together. However, it is not necessary to completely follow the irregularities, and there may be a gap or mismatch among the irregularities to the extent that the effect of the present disclosure is achieved.

In the present embodiment, the block 5 and the wing plate 41 are provided with irregularities that correspond to each other as described above, and even if shear forces due to S1/S2 are applied, the slippage at the interface I1 can be suppressed. Suppressing the slippage increases the rigidity against the shear forces of S1/S2, thereby suppressing the twisting of the vehicle and increasing the torsional rigidity. The steering stability and the straight travel performance of the vehicle can be improved by increasing the torsional rigidity of the vehicle.

Second Embodiment

Figure 4:
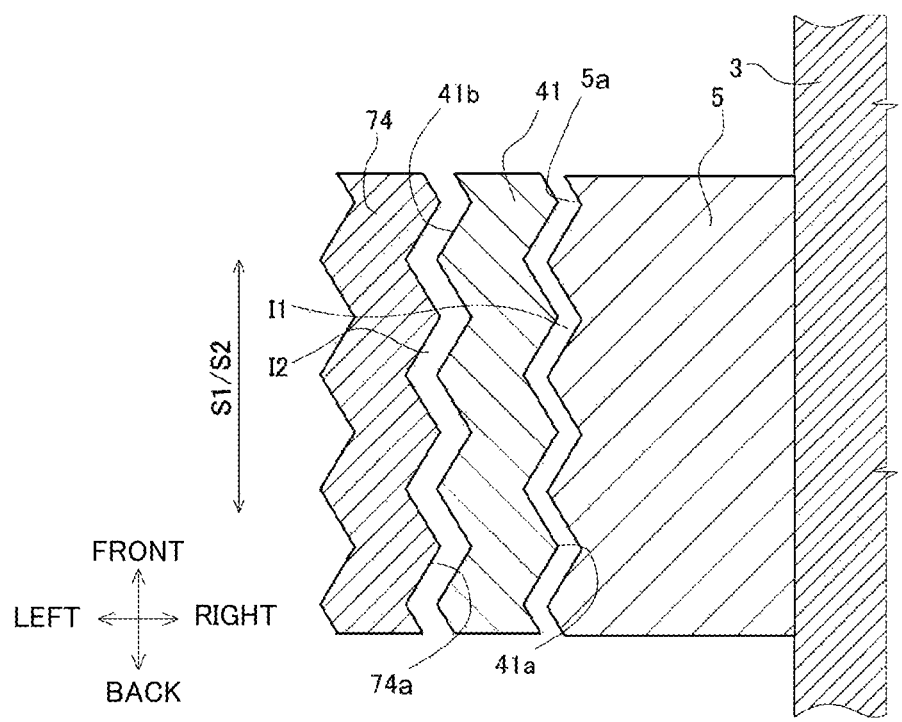
FIG. 4 is an enlarged cross section schematically showing the second embodiment.

FIG. 4 is an enlarged cross section schematically showing the second embodiment.

In the second embodiment, an irregular engagement structure is adopted at the interface I1, and a back surface 41b of the wing plate 41 is also provided with irregularities. The irregularities of a front surface 41a and the irregularities of the back surface 41b do not need to correspond to each other, but the irregularities of the front surface and the back surface naturally correspond to each other, considering press working or the like of a stainless steel plate.

In the second embodiment, irregularities are also given to a front surface 74a of the pressure contact portion 74 of the pressure contact piece 73. The shape of the irregularities of the front surface 74a in this embodiment corresponds to the shape of the irregularities of the back surface 41b of the wing plate 41. Therefore, when the front surface 74a and the back surface 41b of the wing plate 41 contact each other, the irregularities of the front surface 74a and the irregularities of the back surface 41b match appropriately, preventing the slippage due to the shear forces (S1/S2) generated on the side surface of the vehicle. In particular, in the second embodiment, even when restriction of movement by the interface I1 provided with the irregularities is insufficient, the movement at the interface I2 with respect to the shear force is suppressed and prevented. Effects of improvement of the rigidity against the shear force on the side surface of the vehicle, improvement of the torsional rigidity of the vehicle, and improvement of the steering stability and the straight travel performance of the vehicle are produced because of this configuration. This is the same as in the first embodiment.

[Others]

The present disclosure is not limited to the above-described embodiments, and can be appropriately modified and implemented without departing from the spirit of the present disclosure.

For example, a well-known material can be appropriately adopted as a material of each member. In general, hard rubber may be adopted for the block 5, but in the technique of the present disclosure, resin or stainless steel (SUS), or a composite structure thereof, may be adopted.

Further, the vehicle is not limited to the truck 100, and the wing lock structure can be widely applied to other vehicles and moving bodies provided with a wing-body-type cargo bed.

DESCRIPTION OF THE REFERENCE NUMERALS 1 cab
2 cargo bed (wing body)
3 side gate
4 wing side panel
41 wing plate
5 block
5a contact surface of the block
6 front panel
7 wing lock structure
71 handle
72 hooking piece
72a hooking portion
73 pressure contact piece
74 pressure contact portion
74a contact surface of the pressure contact portion
75 hook
100 truck (vehicle)
I1, I2 interfaces
P1 to P3 rotating shafts (the first shaft to the third shaft).
Ts twisting
S1, S2 shear forces

The invention claimed is:

1. A wing lock structure for fixing, in a vehicle provided with a wing-body-type cargo bed having a wing side panel and a side gate, the wing side panel and the side gate in a closed state where the wing side panel and the side gate are closed, the wing lock structure comprising:
   a block that is provided to the side gate, and has a plurality of convex portions that are convex in a width direction of the vehicle and concave portions that are concave in the width direction of the vehicle provided in a longitudinal direction of the vehicle;
   a wing plate provided at a predetermined portion of the wing side panel facing the block in the closed state and having irregularities corresponding to the concave portion and the convex portion on a surface that comes into contact with the block; and
   a pressure contact portion that presses the wing plate to bring the wing plate and the block into contact by pressure.

2. The wing lock structure according to claim 1, wherein the wing plate also has irregularities on a pressure contact portion side, and
   the pressure contact portion has irregularities corresponding to irregularities of the wing plate on a surface that comes into contact with the wing plate.

3. The wing lock structure according to claim 1, comprising:
- a pressure contact piece that has the pressure contact portion at an end and is rotatable at another end opposite to the pressure contact portion around a first shaft provided to the side gate;
- a handle that is rotatable around a second shaft provided at an intermediate portion of the pressure contact piece; and
- a hooking piece that is rotatably provided to a third shaft provided at an intermediate portion of the handle, and has a hooking portion that can be engaged with a hook provided to the side gate, at a free end opposite to the third shaft.

4. A cargo bed for a vehicle comprising a wing lock structure for fixing, in a vehicle provided with a wing-body-type cargo bed having a wing side panel and a side gate, the wing side panel and the side gate in a closed state where the wing side panel and the side gate are closed, the wing lock structure including:
- a block that is provided to the side gate, and has a plurality of convex portions that are convex in a width direction of the vehicle and concave portions that are concave in the width direction of the vehicle provided in a longitudinal direction of the vehicle;
- a wing plate provided at a predetermined portion of the wing side panel facing the block in the closed state and having irregularities corresponding to the concave portion and the convex portion on a surface that comes into contact with the block; and
- a pressure contact portion that presses the wing plate to bring the wing plate and the block into contact by pressure.

5. A vehicle provided with athe cargo bed comprising a wing lock structure for fixing, in a vehicle provided with a wing-body-type cargo bed having a wing side panel and a side gate, the wing side panel and the side gate in a closed state where the wing side panel and the side gate are closed, the wing lock structure including:
- a block that is provided to the side gate, and has a plurality of convex portions that are convex in a width direction of the vehicle and concave portions that are concave in the width direction of the vehicle provided in a longitudinal direction of the vehicle;
- a wing plate provided at a predetermined portion of the wing side panel facing the block in the closed state and having irregularities corresponding to the concave portion and the convex portion on a surface that comes into contact with the block; and
- a pressure contact portion that presses the wing plate to bring the wing plate and the block into contact by pressure.

* * * * *